US008237726B2

(12) United States Patent
Chen et al.

(10) Patent No.: US 8,237,726 B2
(45) Date of Patent: Aug. 7, 2012

(54) REGISTER ALLOCATION FOR MESSAGE SENDS IN GRAPHICS PROCESSING PIPELINES

(75) Inventors: Wei-Yu Chen, Santa Clara, CA (US); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 12/492,500

(22) Filed: Jun. 26, 2009

(65) Prior Publication Data

US 2010/0328334 A1  Dec. 30, 2010

(51) Int. Cl.
*G09G 5/36* (2006.01)
*G06T 1/60* (2006.01)
*G06F 12/02* (2006.01)

(52) U.S. Cl. .................. 345/559; 345/530; 345/543

(58) Field of Classification Search .................. 345/426, 345/440, 501, 506, 522, 530, 543, 559
See application file for complete search history.

(56) References Cited

U.S. PATENT DOCUMENTS

| 4,782,444 | A | * | 11/1988 | Munshi et al. | 717/153 |
| 5,249,295 | A | * | 9/1993 | Briggs et al. | 717/157 |
| 7,176,914 | B2 | * | 2/2007 | Emmot | 345/418 |

OTHER PUBLICATIONS

Briggs et al., "Coloring Heuristics for Register Allocation", Conference on Programming Language Design and Implementation Proceedings of the ACM SIGPLAN 1989, Portland, Oregon, pp. 283-294.
Chaitin et al., "Register Allocation Via Coloring", Computer Language, vol. 6, 1981, p. 47-57.

* cited by examiner

*Primary Examiner* — Joni Hsu
(74) *Attorney, Agent, or Firm* — Trop, Pruner & Hu, P.C.

(57) ABSTRACT

Message sends may be implemented in a graphics pipeline using biased graph coloring. Registers may be allocated by shaders for message sends using biased graph coloring.

19 Claims, 3 Drawing Sheets

REGISTER ALLOCATION FOR MESSAGE SENDS IN GRAPHICS PROCESSING PIPELINES

BACKGROUND

This relates generally to graphics processing pipelines in which a graphics image is developed by a series of processing steps in a graphics pipeline.

A graphics pipeline may include a number of shaders that use message sends to communicate information. A "message send" is a protocol used in graphics pipelines to send messages. Generally, the source for the message send needs to reside in a contiguous physical register before the message can be dispatched. This need for contiguous register allocation often involves explicit move instructions to copy source data into registers assigned to the message send. Thus, there is a need for a register allocation process in which the registers devoted to the message send are allocated with information from the various sources.

DETAILED DESCRIPTION

In accordance with some embodiments, a register allocation scheme for a message send may use biased graph coloring. Register allocation is the process of assigning registers to the payload of a message send. It involves assigning consecutive registers for each message send.

A given source may be associated with a live range. A variable is "live" if it holds a value that may be used in the future. A "live range" marks, for that variable, the program interval during which it is live. Thus, as a simple example, at time S1, a certain variable A may be set equal to something and at another time, S2, the variable A may be used for the last time. Then at a time S3, the variable B may be set equal to something, and then, at time S4, the variable B may be used for the last time. The live range of A is S1-S2 and the live range of B is S3-S4.

Register allocation renames live ranges, which may also be called virtual registers, into a smaller number of hardware registers. Two live ranges may conflict because they overlap. Conflicting live ranges are assigned to different hardware registers. This assignment is because a hardware register can only hold one value at a time. If two live ranges do not conflict then they may be assigned to the same register.

Graph coloring is a register allocation algorithm that works by creating a graphical representation of the program. Each live range becomes a node in the graph and an edge is inserted between two nodes if the two live ranges, represented by those graph nodes, conflict.

Each color represents a different hardware register used for the send message. The register allocation algorithm finds a coloring of the graph such that no two neighboring nodes have the same color. Many such colors may exist.

A preferred color, called a bias, may be assigned that is basically a hint to the register allocation algorithm that it should try to assign this color to a particular live range. Implementing the bias may not always be possible because the color may already be assigned to a neighbor.

Figure 1:
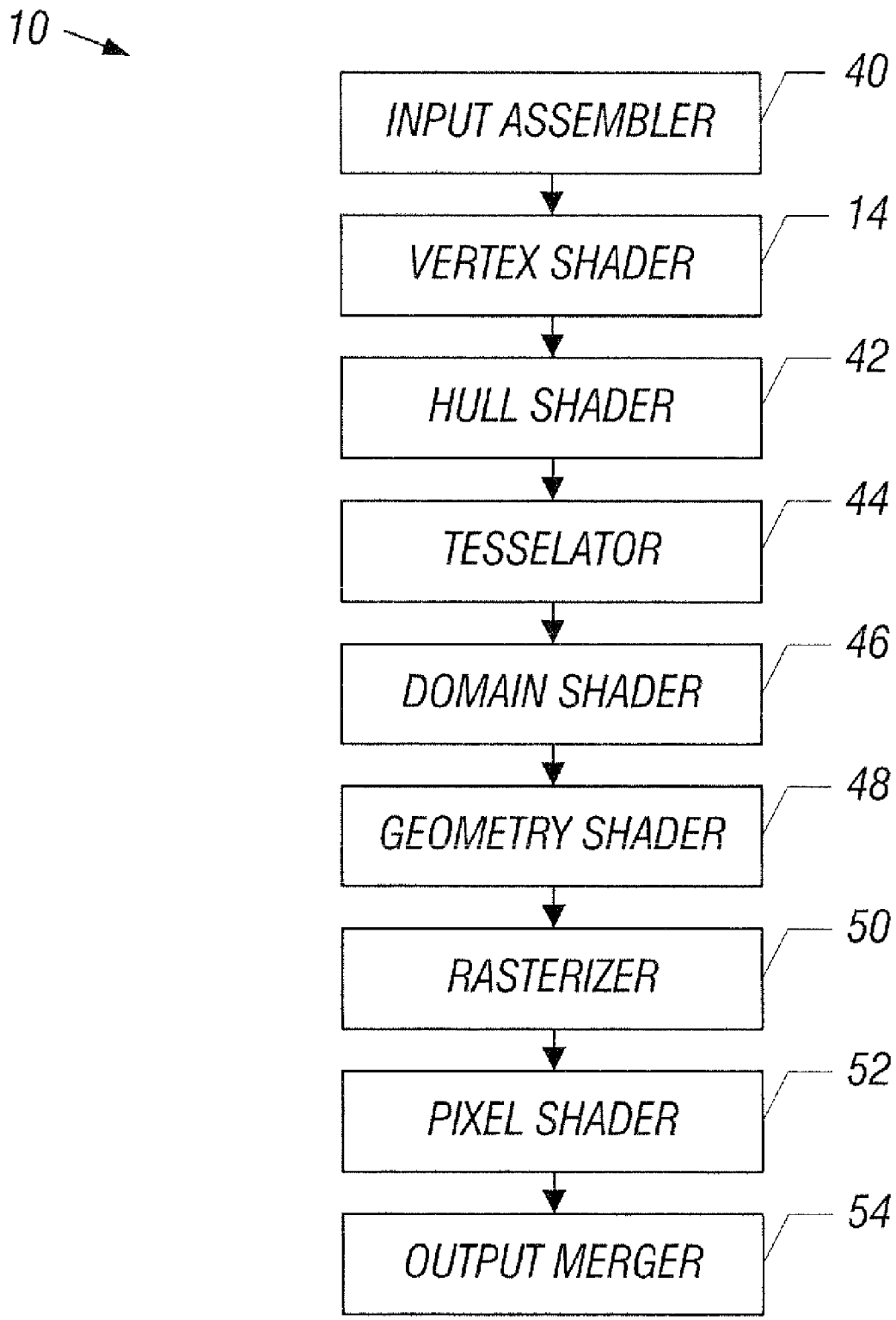
FIG. 1 is a depiction of a graphics pipeline according to one embodiment.

A graphics processor unit 10 graphics pipeline, shown in FIG. 1, may include a set of fixed function units arranged in pipeline fashion which process three-dimensional (3D) related commands by spawning threads. Typically, this process includes rendering primitives.

The input assembler 40 (FIG. 1) is responsible for reading primitives, such as points, lines, and/or triangles, from user buffers and to assemble primitives for later stages.

The vertex shader 14 is an application program interface supplied program that calculates vertex attributes. It also refers to a unit that dispatches threads to shade or calculate the attributes for vertices.

The hull shader 42 converts control points from one representation to another. The converter control may be sent directly to the domain shader. The hull shader may also compute tessellation factors for the tessalator.

The tesselator 44 is a fixed function unit that uses the tessellation factors to subdivide a patch into multiple primitives.

The domain shader 46 evaluates the surface representation of each vertex of each vector. The domain shader sends vertex data to the geometry shader.

The geometry shader 48 is a fixed function unit that dispatches geometry shader threads on its input primitives. Application supplied geometry shaders expand each input primitive into several output primitives in order to perform three dimensional modeling algorithms.

The rasterizer 50 converts an object represented by vertices into a set of pixels that make up the object. The pixel shader 52 is a shader that is supplied by an application translated by jitter and is dispatched to an execution unit by the windower once per pixel.

The output merger 54 generates the format rendered pixel color using a combination of pipeline states, data from pixel shaders, and other sources.

Figure 2:
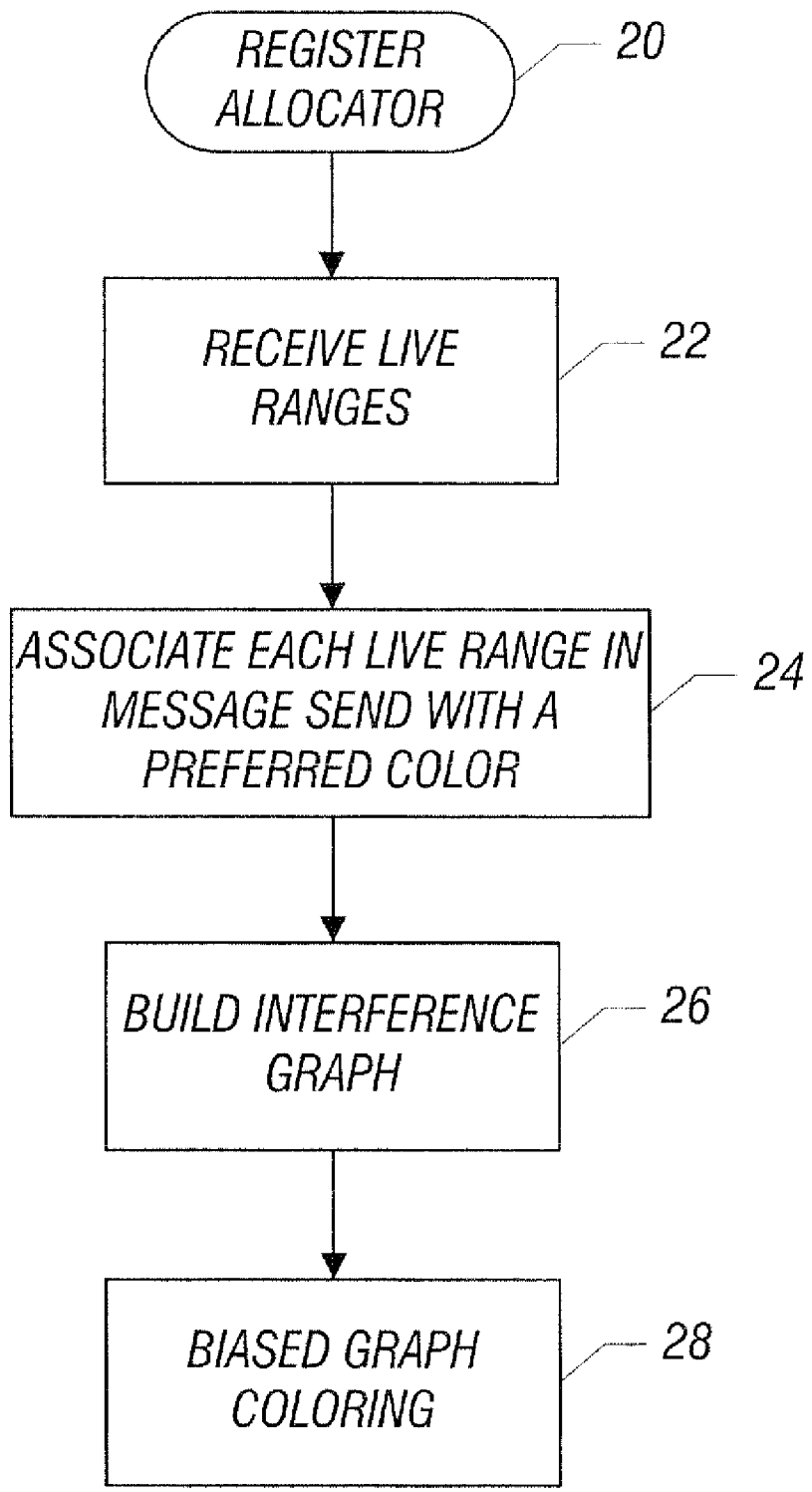
FIG. 2 is a flow chart for one embodiment of the present invention.

Referring to FIG. 2, the register allocation process 20 begins by receiving the live ranges for all the variables used in a message send, as indicated by block 22. The register allocation process may be implemented by any of the shaders 14, 42, 46, or 48, as examples. Then each live range in a message send is associated with a preferred color, as indicated in block 24. Next, an interference graph is built, as indicated in block 26. The interference graph is used to resolve any conflicts. Finally, bias graph coloring is implemented. Every live range is assigned a physical register in the bias graph coloring, as indicated in block 28.

Figure 3:
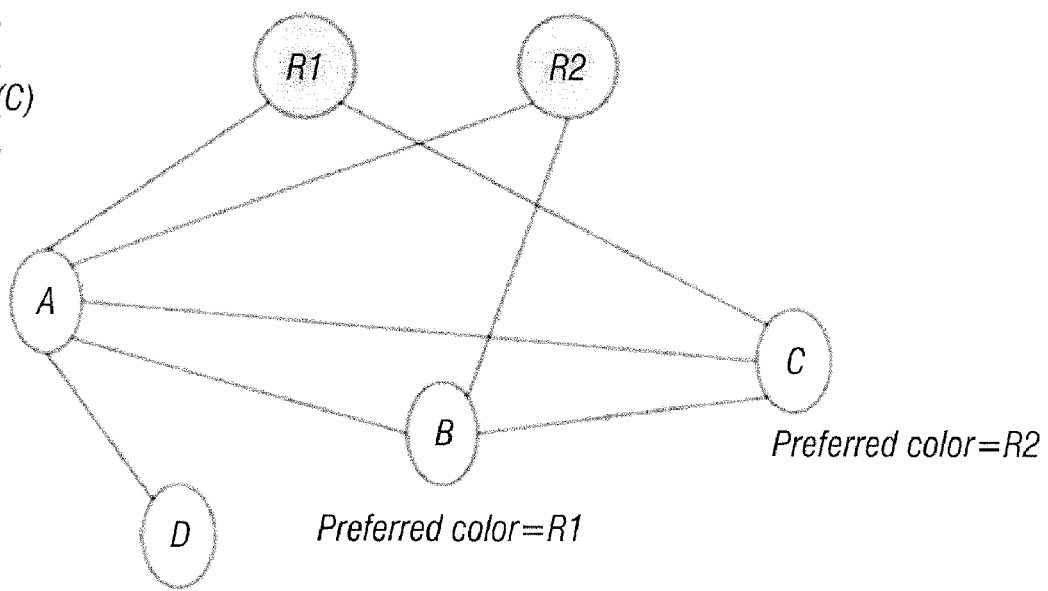
FIG. 3 is an interference graph in accordance with one embodiment of the present invention.

Referring to FIG. 3, a simple interference graph is depicted. In this graph, the variable A may be live from a first instruction to a last instruction. The variable B may be live from a second instruction to the last instruction. Thus, the variables A and B have live ranges that overlap. The variable C may be live from a third instruction to the last instruction and, thus, the variables B and C have overlapping live ranges. Thereafter, variables B and C may be sent. As a result, variable D does not overlap with variables B or C.

Thus, looking at the interference graph, the variables A, B, C, and D are indicated by nodes. There is an edge or a line between variables A and B, indicating interference or conflicting live ranges. Likewise, there is an edge or line between variables B and C, indicating interference. However, there is no interference between variables D and B or variables D and C. Note that there is interference between variables D and A. Even though variables B and C were sent, there still is interference between variables D and A.

Physical registers R1 and R2 are indicated and the line between variable B and R2 and between each of variables A and C and R1 indicate an edge. As a result, certain registers cannot be used for certain variables.

A message source allocation phase runs immediately before register allocation algorithm. A fixed number n of physical registers are used for the allocation of message sources. These physical registers are not exclusively reserved for message sends and may be reused for the virtual registers in the program. To reduce copy instructions, message sources are optimistically coalesced with the actual sources of the send instruction. This may be done in some embodiments by favoring the sources to be assigned to the same physical register as its corresponding message source.

In the register allocation, every live range may be assigned to a preferred color which provides a hint to the allocator to select the physical register that should give the live range and avoids generating explicit move instructions to message sources in a convert function.

The coalescing function may be optimistic because it assigns preferred colors to live ranges without checking for interferences. Thus, such conflicts, where variables have overlapping live ranges that are assigned the same colors, are resolved during the later bias graph coloring stage.

The algorithm may be summarized as follows:

```
func allocatedSendSrcGlobal( )
    foreach instruction inst in program
        if( inst is send)
            findPhysicalReg( inst );
            foreach send source si
                src = SendSrcToSrc[si];
                if( src is valid && canComputeToSend(src) )
                    src.PreferredColor = Reg(si);
```

The canComputeToSend function checks whether the source has a valid definition in the program. That is, it checks to determine whether it is from the payload. The canComputeToSend function also checks to see if the source does not have modifiers or other special constraints, such as being replicated or swizzled, that precludes it from being coalesced.

A live range may be used as a source in multiple message sends, and each message send may assign a different physical register to its corresponding message source. In such case, heuristics may be used to pick one of the physical registers to be the preferred color. The heuristics pick the physical register with the most number of message sends in one embodiment.

Physical registers are then allocated to all message sources in the program and message source coalescing is performed. The interference graph construction algorithm is extended to take into account the physical registers occupied by the message sources.

A node may be created for each physical register used by a message source. During the backward traversal of a basic block, if a message send is encountered, edges are added between the physical registers used by the message sources and the virtual registers that are live at this program point. No edge is inserted between a message source and its corresponding live range whose preferred color is the same as the message source. These extra edges may prevent any virtual registers whose live range contains the instruction to use a physical register occupied by a message source. Ultimately, a move may be needed to set the value of a message source if its corresponding live range has a different physical register.

Bias coloring may be implemented by attempting to assign each live range to its preferred color if it has one. This may not always be feasible because a live range's preferred color may already be assigned to one of its neighbors and, in this case, the register allocator may select another free register for it. To increase the chance of a live range receiving its preferred color, the simplify select stage of the register allocation may be augmented with heuristics. One example of such a heuristic is to assign colors for nodes with a preferred color first. Another possible heuristic is to avoid using the physical registers assigned to send sources for the live ranges without a preferred color. Finally, another example of a heuristic is to avoid assigning to a live range the preferred color of its neighbors.

In some embodiments, message source assignment processing may be reduced into a familiar register allocation problem. The bias graph coloring algorithm may provide maximum flexibility to the register allocator as the preferred colors of each live range merely serve as hints. Thus, in some embodiments, the need to reserve physical registers for message source may be reduced or eliminated. In other embodiments, the ability to coalesce message sources with sources that are not defined in the same basic block may be possible. With the bias graph coloring algorithm, a hint is provided on the physical register that a particular live range should be assigned to.

Execution performance may be increased, in some embodiments, by reducing the number of instructions needed to copy data into message sources. It may also reduce register pressure compared to approaches that reserve physical registers for message sources.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying live ranges of variables used in message sends for graphics processing;
   modeling a plurality of physical registers and the live ranges in an interference graph;
   bias coloring the interference graph based on preferred colors of the live ranges;
   allocating the plurality of physical registers to the message sends based on the interference graph after bias coloring; and identifying live ranges of variables used in message sends from shaders in a graphics pipeline.

2. The method of claim 1 including coalescing message sources with actual sources of a send instruction.

3. The method of claim 2 including favoring sources to be assigned to the same physical register as a corresponding message source.

4. The method of claim 1 including assigning the preferred colors to the live ranges without checking for interferences.

5. The method of claim 4 including resolving conflicts during the bias coloring.

6. The method of claim 1 including using heuristics to pick one of the plurality of physical registers to be a preferred color.

7. The method of claim 6 including using heuristics to pick the physical register with the most number of message sends.

8. The method of claim 1 including assigning colors to nodes with a preferred color first.

9. The method of claim 1 including avoiding the use of physical registers assigned to send sources for live ranges without a preferred color.

10. The method of claim 1 including avoiding assigning to a live range the preferred color of its neighbors.

11. An apparatus comprising:
a plurality of registers for message sends in a graphics pipeline; and
a shader to:
identify live ranges of variables used in the message sends,
model the plurality of physical registers and the live ranges in an interference graph,
bias coloring the interference graph based on preferred colors of the live ranges, and
allocate the plurality of physical registers to the message sends based on the interference graph after bias coloring.

12. The apparatus of claim 11, said shader to avoid the use of physical registers assigned to send sources for live ranges without a preferred color.

13. The apparatus of claim 11, said shader to coalesce message sources with actual sources of a send instruction.

14. The apparatus of claim 13, said shader to favor sources to be assigned to the same physical register as a corresponding message source.

15. The apparatus of claim 11, said shader to assign the preferred colors to the live ranges without checking for interferences.

16. The apparatus of claim 15, said shader to resolve conflicts during the bias coloring.

17. The apparatus of claim 11, said shader to use heuristics to pick one of the plurality of physical registers to be a preferred color.

18. The apparatus of claim 17, said shader to use heuristics to pick the physical register with the most number of message sends.

19. The apparatus of claim 11, said shader to assign colors to nodes with the preferred color first.

* * * * *